(12) United States Patent
Anand et al.

(10) Patent No.: US 12,705,497 B2
(45) Date of Patent: Aug. 11, 2026

(54) FEDERATED LEARNING

(71) Applicant: KONINKLIJKE PHILIPS N.V., Eindhoven (NL)

(72) Inventors: Shreya Anand, Bangalore (IN); Anshul Jain, Bangalore (IN); Shiva Moorthy Pookala Vittal, Bangalore (IN); Aleksandr Bukharev, Eindhoven (NL); Richard Vdovjak, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 668 days.

(21) Appl. No.: 18/032,838

(22) PCT Filed: Oct. 14, 2021

(86) PCT No.: PCT/EP2021/078378
§ 371 (c)(1),
(2) Date: Apr. 20, 2023

(87) PCT Pub. No.: WO2022/084125
PCT Pub. Date: Apr. 28, 2022

(65) Prior Publication Data

US 2023/0394320 A1 Dec. 7, 2023

Related U.S. Application Data

(60) Provisional application No. 63/094,561, filed on Oct. 21, 2020.

(51) Int. Cl.
*G06N 3/098* (2023.01)

(52) U.S. Cl.
CPC .................................... *G06N 3/098* (2023.01)

(58) Field of Classification Search
CPC ...... G06N 3/098; G06N 3/045; G06N 3/0464; G06N 3/063; G06N 3/09; G06N 3/084
See application file for complete search history.

(56) References Cited

U.S. PATENT DOCUMENTS

| | | | | |
|---|---|---|---|---|
| 12,033,039 B2 * | 7/2024 | Sundaresan | ............ | G06N 3/098 |
| 2015/0206064 A1 * | 7/2015 | Levman | ................. | G06N 20/00 706/12 |

(Continued)

FOREIGN PATENT DOCUMENTS

| | | |
|---|---|---|
| CN | 110889509 A | 3/2020 |
| CN | 111126346 A | 5/2020 |

OTHER PUBLICATIONS

Wang et al.; Convergence of Edge Computing and Deep Learning: A Comprehensive Survey; Jan. 30, 2020; IEEE Comm; vol. 22; 869-904 (Year: 2020).*

(Continued)

*Primary Examiner* — Phenuel S Salomon

(57) ABSTRACT

Some embodiments are directed to a federated learning system. A federated model is trained on respective local training datasets of respective multiple edge devices. In an iteration, an edge device obtains a current federated model, determines a model update for the current federated model based on the local training dataset, and sends out the model update. The edge device determines the model update by applying the current federated model to a training input to obtain at least a model output for the training input; if the model output does not match a training output corresponding to the training input, include the training input in a subset of filtered training inputs to be used in the iteration; and determining the model update by training the current federated model on only the subset of filtered training inputs.

20 Claims, 3 Drawing Sheets

(56) References Cited

U.S. PATENT DOCUMENTS

Figure 1A:
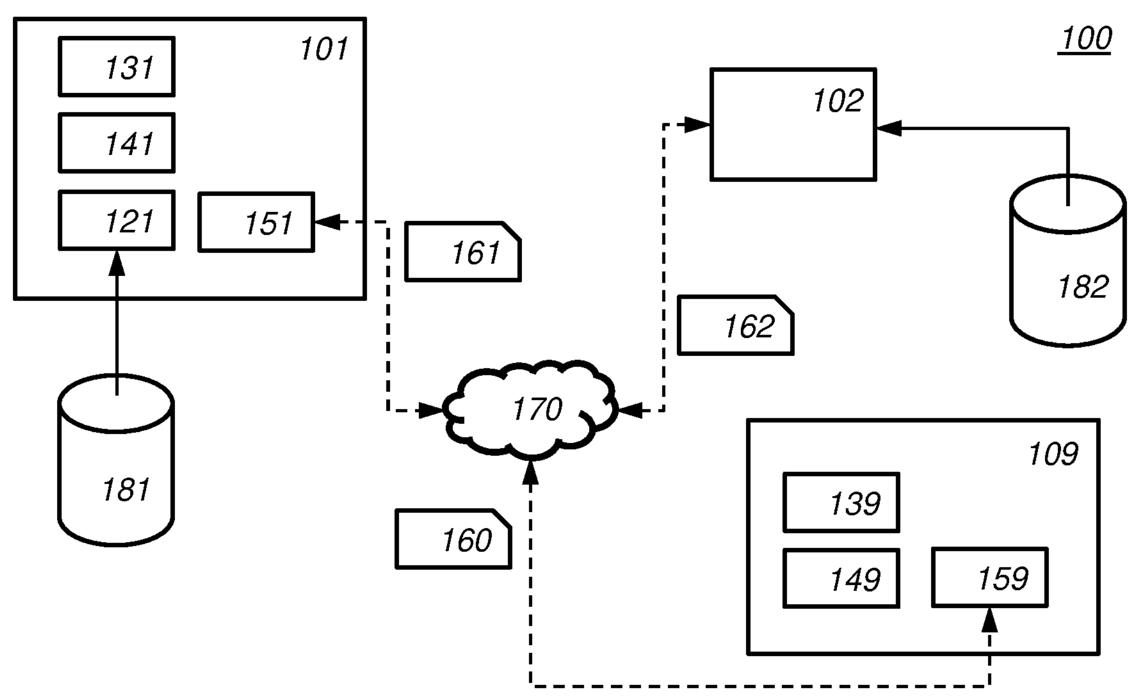

| | | | | |
|---|---|---|---|---|
| 2016/0037402 | A1* | 2/2016 | Rosa | H04W 36/0061 370/331 |
| 2021/0073639 | A1* | 3/2021 | Jakkam Reddi | G06N 20/20 |
| 2021/0117780 | A1* | 4/2021 | Malik | G06N 3/044 |
| 2021/0326757 | A1* | 10/2021 | Rawat | G06N 3/063 |
| 2021/0383210 | A1* | 12/2021 | Chen | G06F 18/214 |
| 2022/0101189 | A1* | 3/2022 | Ben-Itzhak | G06N 20/20 |
| 2023/0394320 | A1* | 12/2023 | Anand | G06N 3/045 |

OTHER PUBLICATIONS

Konecny, J. et al, “Federated Optimization: Distributed Optimization Beyond the Datacenter”. arXiv:1511.03575vl (2015).

International Search Report for PCT/EP2021/078378 filed Oct. 14, 2021.

Wang, X. et al., “Convergence of Edge Computing and Deep Learning: A Comprehensive Survey”, Cornell University Library, (2019).

* cited by examiner

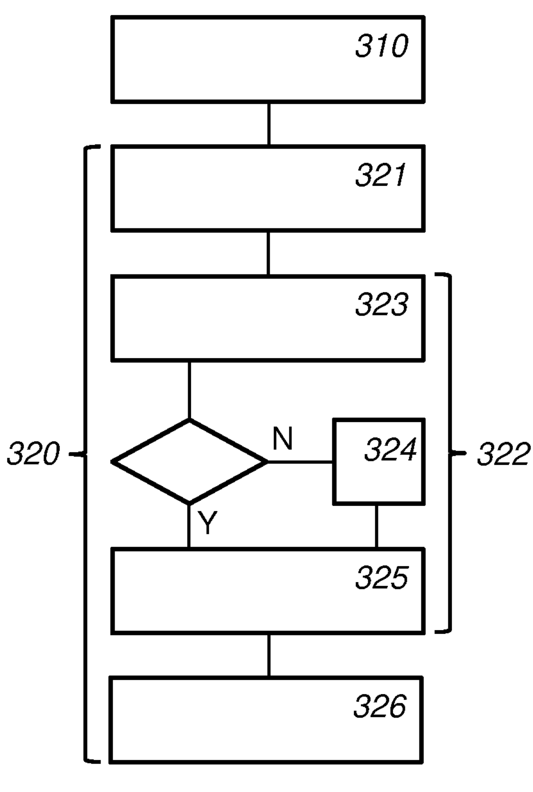
Fig. 3
421
423
N
424
322
Y
425
426
430
440
Fig. 4
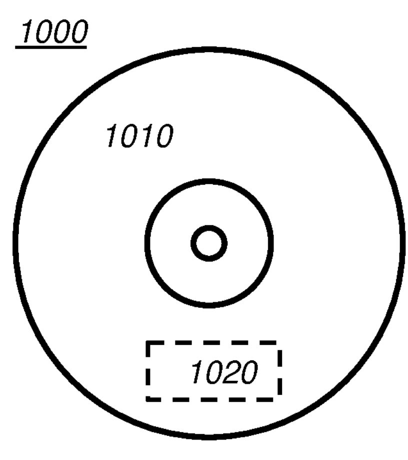
Fig. 5
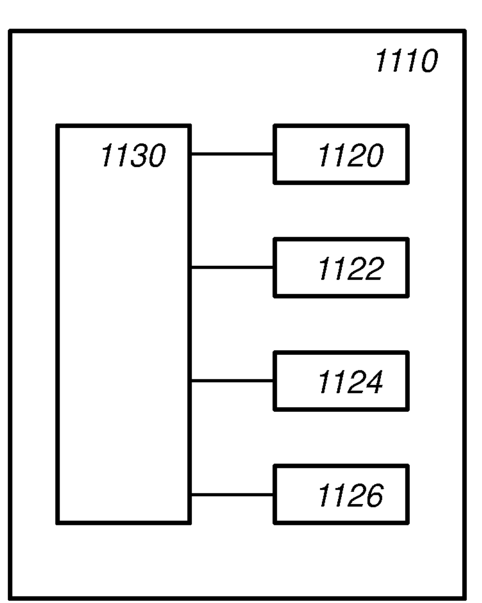
Fig. 6

FEDERATED LEARNING

CROSS-REFERENCE TO PRIOR APPLICATIONS

This application claims the priority benefit under 35 U.S.C. § 371 of International Patent Application No. PCT/EP2021/078378, filed on Oct. 14, 2021, which claims the priority benefit of U.S. Patent Application No. 63/094,561, filed on Oct. 21, 2020, the contents of which are herein incorporated by reference.

TECHNICAL FIELD

The invention relates to an edge device for use in a federated learning system, and to a federated learning system comprising multiple edge devices. The invention further relates to a computer-implemented edge method, to a computer-implemented federated learning method, and to a computer-readable medium.

BACKGROUND

Machine learning is widely regarded as a key enabler for improving healthcare over the next decades. In particular, the increasing amount of data that are available about patients in digital form has the potential to enable personalized healthcare at a much larger scale than happens today. For example, such data may be collected by Internet of Things (IoT) devices that are used in hospitals or by patients themselves at home, e.g., remote health monitoring devices, fitness watches, etc.

To be able to use this increasing amount of data to provide better advise and predictions, typically machine learnable models are used. In order for such machine learnable models to reach sufficient performance, it is important that they are trained on as much data with as much variation as possible. At the same time, due to privacy and data security concerns, data is more and more being stored across many different devices and organizations instead of being collected centrally. Thus, in the medical sector but also in various other settings (e.g., fraud detection in the financial sector, or communication system design in the telecommunications sector) there is a need to train machine learning models based on respective local training datasets stored at respective devices, e.g., IoT devices.

A known technique for training a model on respective local training datasets is called Federated Learning (FL), an example of which is disclosed in J. Konečný et al., "Federated Optimization: Distributed Optimization Beyond the Datacenter" (available at https://arxiv.org/abs/1511.03575 and incorporated herein by reference). In a federated learning system, a shared ("federated") model may be collaboratively learned based on respective local datasets of respective edge devices. The model may be a prediction model, e.g., a model that is trained on labelled training data to, given a training input, output the corresponding training output. Interestingly, in federated learning, such training may be performed without moving training data outside a particular device/premise. In one variant, training is performed iteratively, wherein respective sites/devices of the federated learning system computing model updates by making a training pass of a current version of the federated model over their local training dataset to determine a model update; and wherein an aggregation server takes up the job of aggregating the model updates determined at the respective sites.

SUMMARY

Even though edge devices participating in a federated learning system perform training only on their own respective local datasets, this local training can still be computationally expensive and time-consuming. In particular, a training pass may need to be made over all samples present at an edge device, which can take up significant computational power and time. This is a problem especially in the case of IoT devices, where limited computation power and memory may be available.

One of the objects of the invention is to provide federated learning techniques that increase the efficiency and/or decrease the memory consumption at respective edge devices. Specifically, it is an object to achieve this without requiring additional synchronization or exchange of additional sensitive information between participants of the system.

A first aspect of the invention provides an edge device for use in a federated learning system for training a federated model. The edge device may be comprised in a set of multiple edge devices. The federated learning system may be configured to train the federated model on respective local training datasets of the respective multiple edge devices. The edge device may access its local training dataset. The local training dataset may be labelled, comprising multiple training inputs and corresponding training outputs. The edge device may iteratively train the federated model. In an iteration, the edge device may receive from an aggregation device, or otherwise obtain a current federated model. The edge device may determine a model update for this current federated model based on its local training dataset, and send out the model update, e.g., to the aggregation device. For example, the aggregation device may aggregate model updates of respective edge devices and thereby update the current federated model.

Interestingly, the inventors envisaged to let the edge device selectively choose, in an iteration, which items of the training dataset to train on in that iteration. The selection may be made based on the current federated model. Thus, based on the current state of the federated model, a subset of filtered training inputs to be used in the iteration may be determined for which training is expected to be the most effective. For example, if a model output of the current federated model for a given training input does not match the corresponding training output, then the training input may be included in the subset of filtered training inputs. As another example, if a model output matches the corresponding training output but a confidence score of the current federated model for the training input is low, the training input may be included in the subset as well. Training inputs for which the current federated model provides the correct output with high confidence may be left out of the subset, however.

By performing such filtering, effectively, redundant data samples may be eliminated. Interestingly, by using the current federated model to do the filtering, data samples may be eliminated that are redundant compared to data samples from training data of other parties, without needing access to the training data from these other parties. For example, based on the local dataset of the edge device itself, a training input may not look redundant, e.g., there may be no or only few similar training inputs; but the training input may nonetheless be redundant, e.g., because one or more similar training inputs may be comprised in the training dataset of another party. By filtering based on the current federated model, these items may be filtered out without accessing the other training datasets or even learning specifically that similar training items are present.

By training on only a subset of training inputs and not on all training inputs, at least during the iteration, the number of samples that the model trains on is reduced, thus also reducing the burden on the computation. Still, because a subset is selected for which training is expected to be most effective, in other words, that are expected to provide the strongest training signal for updating the current federated model, little or no harm is done to the overall progress of the federated learning, e.g., little or no relevant information for training the federated model is lost. Thus, for example, no or only a few additional iterations may be needed, and thus also overall performance over all iterations combined is improved. Or, given a fixed number of iterations for example, there may be little or no impact on the accuracy of the obtained model despite the efficiency savings.

Interestingly, given the scale of the federated learning (especially in the context of limited computing power being available, such as where edge devices are IoT devices), even a small amount of reduction in the number of training samples can make a huge impact in terms of computation power and also time required for training the federated model. For example, in an iteration the number of filtered training inputs to be used in that iteration may decrease by at least 5% or at least 10%. Already with such numbers, the burden on the computation can be reduced to a great extent. Interestingly, although an additional filtering operation is needed, the inventors found that it can be performed with little overhead, as described herein.

Another advantage of the provided techniques is that they can be applied selectively and locally. For example, an edge device can perform filtering in an iteration in dependence on its current workload and/or amount of battery power left, e.g., the edge device can decide whether or not to perform filtering, or to what extent to perform the filtering. For example, the edge device may be requested to provide a model update in a certain amount of time, and perform the filtering in such a way that the model update can be determined in the available time, e.g., given the current workload. Thus, for example, the edge device may perform filtering in one iteration but not in the next, etc.

For this, no global configuration may be needed, and in fact, an aggregation device or other devices of the system may not even know whether a given edge node performed filtering and/or by how much. Thus, for example, another edge node may not learn that the edge device had a high workload and thus had to resort to filtering, and/or that the edge device was able to filter out a large number of training inputs due to their similarity with training items that the model was already trained on. Thus, leakage of sensitive data is reduced. Since the decision whether to perform filtering may be made locally by an edge device, it may also not be needed to adapt the aggregation device to allow filtering in the federated learning system, e.g., a standard aggregation device may be used.

In an embodiment, the edge device performs one or more iterations in which a model update is determined by training on the full local training dataset, followed by one or more iterations in which a model update is determined by training on only a subset of filtered training inputs as described above. Thus, it may be ensured that the full range of information present at the device is used. Since the initial iterations are typically especially important for determining the direction of the optimization, the inventors found that the performance penalty incurred by using the full dataset as opposed to a filtered dataset, is in the first few iterations often outweighed by the benefits of getting a better-trained model. In later iterations, it becomes especially important to tweak the model for non-working training inputs, and thus, filtering may be more effective.

In an embodiment, the edge device is an IoT device or other type of resource-constrained device. For example, in various embodiments, the processor system of the edge device may be implemented as a system-on-chip (SoC). In various embodiments, the processor system may not comprise a graphics processing unit (GPU). In an embodiment, the memory of the edge device may also be limited, e.g., the memory may be an on-chip memory of the system-on-chip, and/or may generally be limited to 512 MB of memory, 1 GB of memory, or 4 GB of memory. In an embodiment, the edge device is powered by a battery and/or a solar cell for example, e.g. is not connected to wall power. In an embodiment, the edge device is a device for use in or by a hospital, for example a PACS or EMR server or other type of database server. Such devices typically do not have a GPU, making training less efficient. Such resource constraints make the techniques provided herein particularly useful.

In an embodiment, the processor system is configured to train the current federated model by applying multiple training epochs to the subset of filtered training inputs. In an epoch, each filtered training input may be used once to derive a training signal for the model update. Applying multiple epochs based on the same filtering improves performance since the number of times that the filtering is performed is reduced, and moreover improves training stability by ensuring that the model update is determined for a stable set of training inputs. More generally, performing multiple epochs in an iteration, regardless of whether filtering is done per epoch or per iteration, is advantageous for reducing the amount of communication and the number of times the model updates of the respective edge devices need to be aggregated.

In an embodiment, a confidence score of the current federated model for the training input is determined. The confidence score may indicate for example a probability that the model output provided by the model is correct. For example, a classification score such as a softmax score may be used. If the confidence score does not exceed a threshold, the training input may be included in the subset of filtered training inputs. For example, the current federated model may output a model output for an input that matches the training output for this input, but the confidence score may indicate low confidence for this model output. This indicates that it is beneficial to train the current federated model on this input, so that the confidence of the model for this input may be improved and accuracy for inputs similar to it may be improved. By training the current federated model not only on inputs for which it does not currently work but also on inputs for which it has low confidence, training can be made faster by using more relevant available training signals.

In an embodiment, training the current federated model may involve a forward pass, in which the current federated model is applied to training inputs to determine model outputs; and a backward pass, e.g., backpropagation, in which the model update is determined based on the determined model outputs. For example, training may be performed by (stochastic) gradient descent or similar techniques. Interestingly, in such cases, it is possible to perform the filtering to determine the subset of training inputs to be used, based on the model outputs determined in the forward pass. Thus, the performance overhead of performing the filtering is reduced since it is combined with the training.

Typically, the backward pass is more resource-intensive than the forward pass. Since the backward pass is made more efficient because of the filtering, a significant performance improvement may be reached.

In an embodiment, the subset of filtered training inputs to be used in the iteration is smaller than the subset of filtered training inputs to be used in a previous iteration, e.g., the immediately preceding iteration. Since the quality of the model typically improves during training, also the number of inputs to be selected for training because the model performs inadequately on them, may generally reduce over-time. For example, compared to the previous iteration, the number of inputs used may be reduced by at least 5%, or by at least 10%. In a next iteration, this number of inputs can for example again be reduced by at least 5% or at least 10% compared to the iteration before it, and so on. This way, over time, a larger and larger efficiency improvement may be attained.

In an embodiment, a training input may be included in the subset of items to be trained on, that was not included in this subset in a previous iteration. Thus, training inputs need not be discarded from the set of inputs to use forever. For example, in one iteration the current model may work well for a certain training input, whereas in a later iteration, e.g., due to model updates from another edge device, the model may work less well, based on which the training input may be selected again. In particular, determining the subset of filtered training inputs may be performed in such a way that it does not depend on what subset of training inputs was selected in previous iterations, e.g., the whole local dataset may be filtered. By allowing the training input to be used again later, model accuracy is improved. It is also possible to filter from previously filtered inputs only. This may make the filtering itself faster, but the benefits of being able to re-include model inputs in many cases outweigh this faster filtering.

In an embodiment, the edge device receives the current federated model from an aggregation device of the federated learning system, and sends the model update to the aggregation device. The aggregation device may then aggregate model updates of respective edge devices to update the current federated model and send the updated model to (one or more of) the edge devices in a next iteration. Such so-called centralized federated learning is particularly beneficial in the setting of resource-constrained edge devices for moving the resource- and communication-intensive aggregation task to a separate aggregation device. Even with a central aggregator, interestingly, the edge device itself may perform the filtering and/or the filtering may be configured at the edge device, so that the edge device can be configured optimally depending on the local situation.

In other embodiments, decentralized federated learning may be used in which the federated learning system does not comprise an aggregator device, but in which an edge device sends and receives model updates to and from other edge devices, and itself updates the current aggregated model by aggregating the model updates received from the other edge devices.

In an embodiment, the edge device may determine an initial federated model by training on the local training dataset, and send the initial federated model to one or more other devices of the federated learning system. Typically, the full local training dataset is used. Federated learning systems typically assume an initial model to be available, e.g., the model to be distributed as the current federated model in the first iteration. By letting the edge device provide this initial federated model, other parties of the system do not need to do this and in particular, an aggregator device (if using) need not have access to a local training dataset.

In an embodiment, the model update may comprise an updated set of parameters for the current federated model or a gradient for updating the current federated model. For example, the gradient can be used for federated learning based on gradient descent, e.g., stochastic gradient descent. The updated set of parameters can for example be used for updating the current federated model by federated averaging. Other known types of model update for federated learning systems can be used as well.

A further aspect of the invention provides a federated learning system including an aggregation device and multiple edge devices as described herein. Other aspects provide a computer-implemented edge method, a computer-implemented federated learning method, and a computer-readable medium. The various advantages discussed with respect to the edge device also apply to these aspects.

The edge method and federated learning method described herein may be applied in a wide range of practical applications. Such practical applications include, e.g., federated learning of predictive models in healthcare or finance.

An embodiment of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTIONS OF DRAWINGS

Figure 1B:
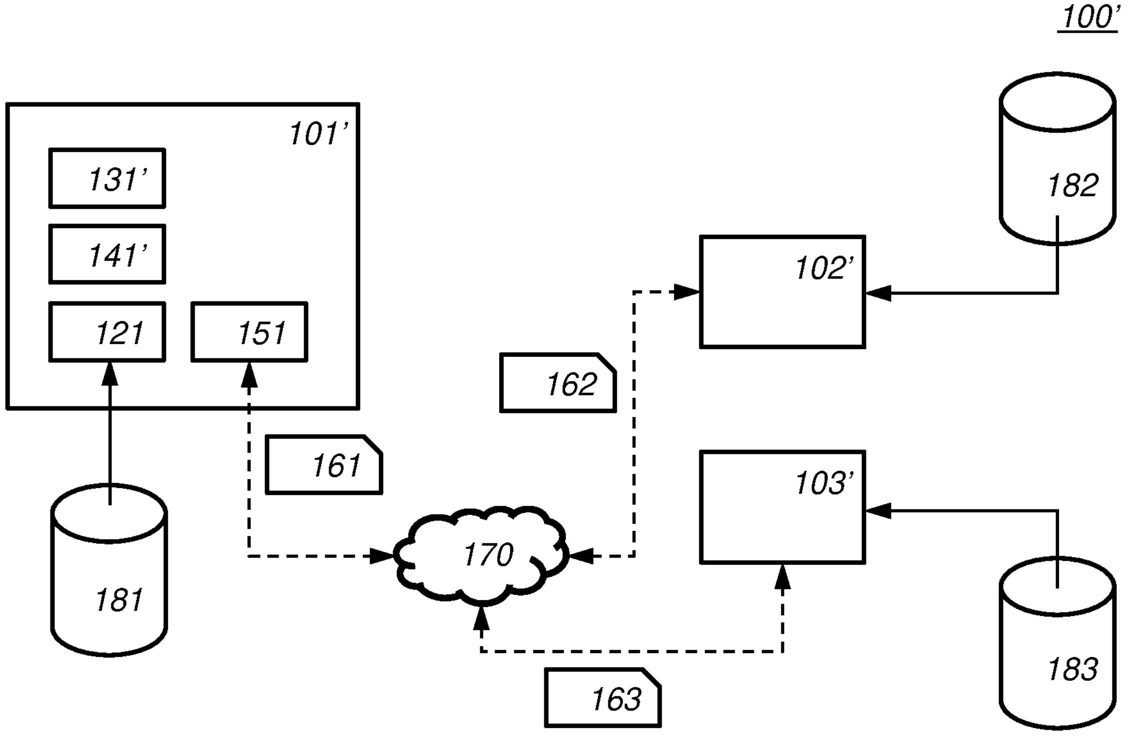
Figure 2:
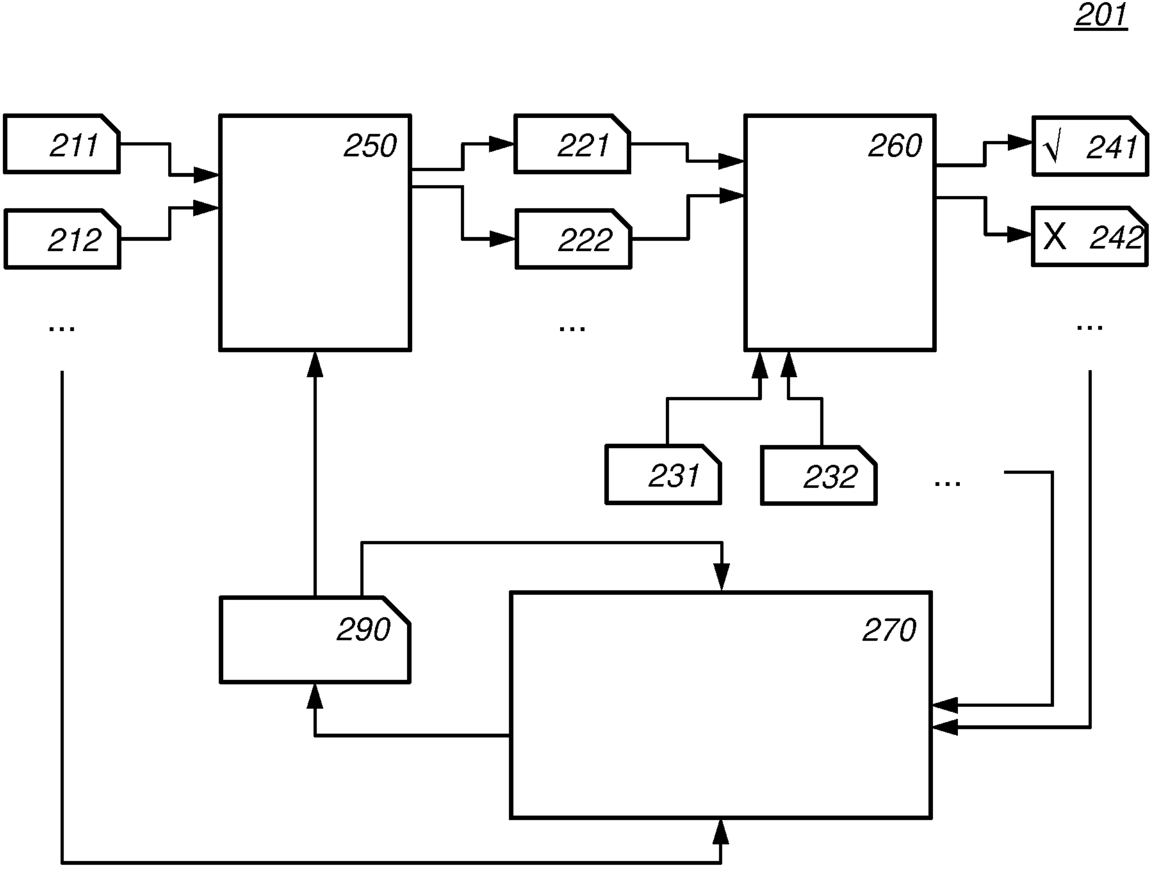

These and other aspects of the invention are apparent from and will be elucidated with reference to the embodiments described hereinafter. In the drawings, FIG. 1*a* schematically shows an example of an embodiment of a federated learning system, FIG. 1*b* schematically shows an example of an embodiment of a federated learning system, FIG. 2 schematically shows an example of an embodiment of an edge device, FIG. 3 schematically shows an example of an embodiment of an edge method, FIG. 4 schematically shows an example of an embodiment of a federated learning method, FIG. 5 schematically shows a computer readable medium having a writable part comprising a computer program according to an embodiment, FIG. 6 schematically shows a representation of a processor system according to an embodiment.

It should be noted that items which have the same reference numbers in different Figures, have the same structural features and the same functions, or are the same signals. Where the function and/or structure of such an item has been explained, there is no necessity for repeated explanation thereof in the detailed description.

REFERENCE SIGNS LIST

The following list of references signs is provided for facilitating the interpretation of the drawings and shall not be construed as limiting the claims.

100,100' federated learning system
101,101',102,102',103' edge device
109 aggregation device
121 storage interface
131,131',139 processor system
141,141',149 memory
151,159 communication interface
160 current federated model
161,162,163 model update
170 computer network
181,182,183 local training dataset
201 edge device
211,212 training input
221,222 model output
241,242 filtering of training dataset
231,232 training output
250 model application
260 filtering
270 training
290 current federated model

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the presently disclosed subject matter is not limited to the embodiments, as feature described herein or recited in mutually different dependent claims.

FIG. 1*a* shows an example of an embodiment of a federated learning system 100. Federated learning system 100 may be for training a federated model on respective local training datasets of multiple respective edge devices.

Federated learning system 100 may comprise multiple edge devices, e.g., at least three, or at least five edge devices. However, the number of edge devices can also be much larger, e.g., at least 200 or at least 300. By way of example, the figure shows two edge devices 101, 102. An edge device may be also be referred to as a "node" of the federated learning system 100.

The edge devices 101, 102 have respective local training datasets 181, 182. Edge devices typically do not have access to each other's local training datasets, and also an aggregation device typically does not have access to the local training datasets. Still, using the provided techniques, a federated model can be trained.

The local datasets are typically labelled datasets, e.g., datasets each comprising multiple training inputs and corresponding training outputs. For example, the training inputs can be images, with the training outputs being classifications or segmentations of those images, for instance. For example, a local dataset may comprise at most or at least 1000, or at most or at least 10000 training inputs. Interestingly, even if a local dataset may be relatively small, federated learning still allows an accurate model to be derived from it by combining it with other local datasets. For example, the overall number of training inputs may be at least 100000 or at least 1000000.

The federated model may be parameterized by a number of trainable parameters, e.g., at most or at least 10000 or at least 100000 trainable parameters. For example, the federated model may comprise a neural network, which may include, e.g., convolutional layers and the like. For example, the neural networks may have at least 2, 5, 10, 15, 20 or 40 hidden layers, or more, etc.

The federated learning system may be for optimizing the trainable parameters with respect to the combined training dataset, e.g., the parameters may be optimized to encourage the model to infer training outputs from training inputs. Interestingly, in a federated learning system 100 this may be achieved without collecting the respective local training datasets in one place.

The training performed in federated learning system 100 may be end-to-end, e.g., starting from respective labelled training datasets of training model inputs and corresponding labels (outputs), a model may be obtained for predicting labels given inputs. No pre-training or manual supervision during the training process may be needed.

Generally, the federated model can be any type of machine learnable model. For example, the federated model can be a neural network (also referred to as an artificial neural network), e.g., a deep neural network or a convolutional neural network. Other types of model are possible, e.g., the model may be a Support Vector Machine (SVM) or a random forest. The federated model may be an image processing model (e.g., an image classification or image segmentation model), but other tasks as possible as well. Techniques to train such models by federated learning are known per se and may be adapted as described herein. For example, the federated model may be trainable by gradient descent, e.g., stochastic gradient descent, in which case for example federated stochastic gradient descent or federated averaging may be used for the training.

The federated learning system 100 in this example also comprises an aggregation device 109. Such a federated learning system 100 with an aggregation device 109 may be referred to as a centralized federated learning system.

The training of the federated model may be performed iteratively. For example, the training may take at least ten or at least twenty iterations. In an iteration, the aggregation device 109 may send a current federated model 160 to one, multiple, or all of the edge devices 101, 102. An edge device 101, 102 may receive the current federated model 160, determine a model update 161, 162 for the current federated model based on its local training dataset 181, 182, and send the model update 161, 162 to the aggregation device 109. The aggregation device may receive the model updates 161, 162, and update the current federated model by aggregating said updates. In a next iteration, the updated current federated model may again be sent to one or more edge devices, etc. The training may be performed for a predefined number of iterations or until a stopping criterion is reached that is typically evaluated by the aggregation device, e.g., until the model converges and achieves an optimal performance. Interestingly, due to training on local datasets, the federated learning may preserve the privacy of the data.

Many implementation choices regarding such centralized federated learning are known in the art per se and may be applied. For example, the set of edge devices to which the current federated model is sent, may vary per iteration. The federated learning can also be asynchronous, e.g., split learning may be used. In that sense, the training being performed iteratively merely means that the aggregation device performs repeated updates to the current federated model and that an edge device repeatedly receives a current model and determines a model update for it; it is possible, e.g., for the aggregation device to send a current federated model to an edge device if it is still waiting for another edge device to send a model update with respect to a previous version of the federated model.

Moreover, although in this figure the aggregation device 109 is separate from the edge devices 101, 102, it is also possible for one of the edge devices to be combined with the aggregation device.

Edge device 101 may comprise a processor system 131, a memory 141, and a communication interface 151. Edge device may also comprise a storage interface 121 for accessing its local training dataset 181. For example, as shown in the figure, the storage interface may be configured to communicate with a data storage. The data storage may be a local storage of system 110, e.g., a local hard drive or memory. Data storage may be non-local storage, e.g., cloud storage. The data storage can also be memory 141. Processor system 131 may be configured to iteratively train the federated model by, in an iteration: obtaining a current federated model, in particularly, by receiving the current federated model 160 from the aggregation device 109; determining a model update 161 for the current federated model based on the local training dataset; and sending the model update to one or more other devices of the federated learning system, in particular, to the aggregation device 109.

As also discussed elsewhere, edge device 101 may be a resource-constrained device, e.g., processor system 131 may be implemented as a system-on-chip and/or have limited memory 131, e.g., at most 512 MB, and/or may not have a connection to wall power and/or may not have a GPU. Edge device 101 may be an Internet of Things (IoT) device, e.g., a device that has a sensor interface for obtaining sensor data from a sensor, e.g., a camera, a motion sensor, etc., and that is configured to continuously collect sensor data from the sensor for local and/or remote analysis. The training data may be based on such sensor data, for example. Edge device 101 can also be a medical terminal, e.g., comprising a screen to inspect medical records and/or images, and comprising an interface for accessing medical data from an EMR (Electronic Medical Record) system, from a medical imaging device (e.g., a CT, MRI, or x-ray device), and the like. Edge device 101 can be an EMR or PACS server providing access to a database of medical data of which the training data 181 is part.

Aggregation device 109 may comprise a processor subsystem 139, a memory 149, and a communication interface 159 similar to the respective components of edge device 101. Memory 149 may be for storing model data representing the current federated model, e.g., a set of parameters of the current federated model. Processor system 139 may be configured to iteratively train the federated model by, in an iteration: sending a current federated model to one or more edge devices; receiving model updates from the one or more edge devices, and updating the current federated model by aggregating said model updates.

In some embodiments, aggregation device 109 may update the current federated model by using federated averaging, and in particular, by using FedProx (disclosed in https://arxiv.org/abs/1812.06127 and incorporated herein by reference). In some embodiments, aggregation device 109 may use matched averaging to update the current federated model. In some embodiments, privacy is further improved by performing the averaging under encryption, e.g., using homomorphic encryption.

The devices of federated learning system 100, including edge devices 101, 102 and aggregation device 109, may communicate with each other, external storage, input devices, output devices, and/or one or more sensors over a computer network 170. The computer network 170 may be an internet, an intranet, a LAN, a WLAN, etc. The computer network 170 may be the Internet. The devices may comprise respective communication interfaces 151, 159 arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The execution of devices 101,102,109 may be implemented in a processor system, e.g., one or more processor circuits, e.g., microprocessors, examples of which are shown herein. FIG. 2 shows functional units that may be functional units of the processor system. For example, FIG. 2 may be used as a blueprint of a possible functional organization of the processor system. The processor circuit(s) are not shown separate from the units in these figures. For example, the functional units shown in FIG. 2 may be wholly or partially implemented in computer instructions that are stored at device 101, e.g., in an electronic memory of device 101, and are executable by a microprocessor of device 101. In hybrid embodiments, functional units are implemented partially in hardware, e.g., as coprocessors, e.g., neural network coprocessors, and partially in software stored and executed on devices 101, 102, 109. Parameters of the federated model and/or training data may be stored locally at devices 101, 102,109 or may be stored in cloud storage.

FIG. 1*b* schematically shows an example of an embodiment of a federated learning system 100'. This example is based on that of FIG. 1*a* and various alternatives described with respect to that figure also apply here. By way of example, three edge devices 101'-103' are shown, each having access to their own respective local datasets 181, 182, 183. System 100' may be for training a federated model on the local datasets 181-183 of the respective edge devices. For example, edge devices 101',102' may be based on edge devices 101,102 of FIG. 1*a*. in FIG. 1*a*. In particular, edge device 101' may comprise a storage interface 121 for accessing local dataset 181; a processor system 131'; a memory 141'; and a communication interface 151 for communicating with other devices, including other edge devices 102', 103', over a communication network 170 similarly to in FIG. 1*a*.

In this example, the federated learning system 100' does not comprise an aggregation device. That is, the federated learning system is a decentralized federated learning system.

Similarly to system 100, federated learning in system 100' may take place by iterative training being performed by the edge devices, e.g., edge device 101', of the system. In an iteration, edge device 101' may obtain a current federated model; determine a model update 161 for the current federated model based on the local training dataset 181; and send the model update 161 to one or more other devices of the federated learning system. Interestingly, in this example, the edge device 101' obtains the current federated model not by receiving it from an aggregation device, but by maintaining its own local version of the current federated model; receiving one or more model updates 162, 163 for the current federate model from other edge devices 102', 103' of the federated learning system; and updating the current federated model by aggregating said model updates 162, 163.

As above, model updates 162-163 may be received by device 101' from all other edge devices 102', 103' or a subset (that may differ per iteration) and may be sent by device 101' to all other edge devices 102', 103' or a subset (that may also differ per iteration and need to not correspond to the set of devices an update was received from). Also in this case, the iterative nature of the training refers to the edge device 101' repeatedly updating its current federated model based on model updates determined by the device itself and/or other devices and does not imply synchronization. Decentralized federated learning may eliminate a single point of failure. Interestingly, since various provided techniques can be applied locally at edge devices, performance can be improved without requiring synchronization.

FIG. 2 schematically shows an example of an embodiment of an edge device 201 for use in a federated learning system, e.g., federated learning system 100 of FIG. 1 or federated learning system 100' of FIG. 2. For example, edge device 201 may be based on edge device 101 of FIG. 1*a* or edge device 101' of FIG. 1*b*.

Edge device 201 may have access to a local training dataset. The local training dataset may comprise multiple training inputs. By way of example, two training inputs 211, 212 (e.g., images) are shown. The local training dataset may be a labelled training dataset and accordingly, edge device 201 may have access to training outputs corresponding to the training inputs (e.g., classifications or segmentations of the respective images). Shown are two training outputs 231, 232 corresponding to training inputs 211, 212, respectively.

As also discussed with respect to FIG. 1*a* and FIG. 1*b*, edge device 201 may contribute to the training of the federated model by obtaining a current federated model 290, determining a model update for the current federated model 290 based on the local training dataset, and sending the model update to one or more other devices of the federated learning system.

In order to determine the model update, model application 250 may apply the current federated model 290 to respective training inputs 211, 212 to obtain respective model outputs 221, 222. Typically, model application 250 involves applying the model 290 to all training inputs.

As a result of model application 250, apart from model outputs 221-222, also confidence scores (also known as classification scores; not shown in the figure) for the respective model outputs may be obtained, e.g., a confidence score may indicate a probability that the model output is correct, e.g., a probability that a classification or other discrete model output is correct, or a confidence interval for a continuous model output, etc. As discussed further below, model application 250 may optionally be performed as the forward pass of training 270 the model, in which case model application 250 may for example also output intermediate values, e.g. neural network node activations, as needed for a later backward pass of the training 270.

Interestingly, a filtering 260 may be performed to determine a subset of filtered training inputs to be used in a present iteration for determining a model update for the current federated model 290 e.g. to be sent to other parties of the federated learning system. The filtering may be based on comparing determined model outputs 221, 222, to training model outputs, 231, 232. Filtering 260 can be performed in parallel to model application 250. The figure shows a filtering result 241, 242 in which training input 241 is included in the subset, as illustrated by the check sign, and in which training input 242 is not included in the subset, as indicated by the cross.

Filtering 260 may be performed in order to select a subset of training inputs for which training 270 is most effective, e.g., for which a greatest improvement in performance of the current federated model 270 is expected.

In particular, for a given training input, it may be determined that the model output does not match the training output corresponding to the training input. For example, for model input 211 it may be determined that determined model output 221 does not match training model output 231. For example, not matching may mean that the model output is different from the training output, e.g., a different class in the case of classification. Or, not matching may mean that the model output differs from the training output by a difference that exceeds a threshold, e.g., in the case of a regression model. In such cases, since the model does not provide a correct, or sufficiently correct, output for that training input, this training input may be included in the subset of inputs to be trained such that the performance of this model for this training input may be improved.

As another example, filtering 260 may be based on a confidence score of the current federated model 290 for the training input 211-212. For example, if the confidence score does not exceed a threshold, the training input 211-212 may be included in the subset 241-242 of filtered training inputs. Thus, even if the determined model output for a training model input matches the training model output, this model input may still be included in the subset of items used for training. This way, the model can be trained to improve its certainty regarding this model input. For confidence scores on a scale from 0, no confidence; to 1, full confidence, the threshold can be at most or at least 0.3 or at most or at least 0.7, for example.

For example, the following decision procedure may be used to decide whether to include a training input in the subset of training inputs to be used:

Does determined model output match training model output?

```
If no -> include in subset
If yes -> is confidence score above a given threshold, e.g., 0.5?
  If no -> include in subset
  If yes -> do not include in subset
```

Instead of using a fixed threshold for all matching model inputs, it is also possible to use a threshold that depends on a degree of matching, e.g., a difference between the training model output and the determined model output, for example.

More generally, the decision whether to include a training input in the subset of training inputs to be used, may be made based on a contribution of the training input to a loss function used for training 270 of the current federated model 290. For example, the loss function may include a sum of losses of respective training inputs. A training input may be included if its loss contribution exceeds a given threshold, or belongs to the top-K losses for a given K, for example. It is noted that using a loss function typically implies that model inputs for which the determined model output does not match the training model output are included, and may also imply that training model inputs for which the confidence score does not exceed a threshold are included.

In many cases, filtering 260 is performed by applying a fixed criterion to respective model inputs. However, it is also possible to perform filtering 260 adaptively based on a desired number of items to be used in training 270. For example, the desired number of training inputs may be based on an amount of time available for training (e.g., specified by the aggregation device via a signal to the edge device) and/or a current resource utilization of the edge device 201, e.g., CPU workload, amount of battery power available, etc. Adaptive filtering can be performed, e.g., by applying a fixed criterion but then stopping the filtering 260 (and possibly also the model application 250) when the desired number of training inputs is reached; or by using a criterion based on results of model application 250, e.g., by selecting the top-N contributors to the loss function for the current federated model, or a combination of these strategies. It is also possible to apply a degree of randomness to the filtering, e.g., items that do not satisfy a criterion to may be included with a certain probability. This may benefit stability of training.

For example, the model may be repeatedly applied 250 to training inputs 211-212, and a filtering 260 of respective training inputs may be made, until a given number of filtered training inputs are obtained, or until a given combined contribution to the loss function has been reached, etcetera.

In many embodiments, the model application 250 and filtering 260 are applied also to items that were not selected for training in previous iterations. Accordingly, for example, a training input may be included in the subset determined by the filtering 260, that that was not included in such a subset of filtered training inputs of a previous iteration. For example, a previous version of the federated model may have correctly classified the model input, but due to an update e.g. by another edge device, the current federated model 290 may now misclassify it. Interestingly, by not basing the filtering on previous filterings, such newly introduced or re-introduced accuracy problems of the federated model can still be corrected.

Still, in many embodiments, the subset of filtered training inputs to be used in the iteration is smaller than a subset of filtered training inputs to be used in a previous iteration, e.g., at least 5% or at least 10% smaller than in the iteration immediately preceding it. This may be because the current federated model 290 becomes more accurate over time, and thus less inputs to the model satisfy the criterions for being selected. Thus, efficiency of the training may improve over time due to the provided techniques.

It is not needed to apply filtering 260 in all iterations. In some embodiments, one or more iterations are performed in training 270 is performed on the full local training dataset 211-212 to determine a model update. For example, these can be the initial one or more iterations of the training, e.g., at most or at least two, at most or at least three, or at most or at least five iterations. Filtering 260 may then be applied in all subsequent iterations, for example.

The number of such iterations without filtering is typically predefined although it can also be based on the performance of the model, e.g., edge device 201 or the aggregation device of the federated learning system (if present) may decide to stop training on the full local dataset 211-212 once the current federated model 290 has reached sufficient performance or training stability on the local dataset or on the combination of local datasets of the respective parties. The aggregation device may be configured to send a signal indicating whether or not to perform filtering 260, the edge device being configured to act according to that signal.

Performing initial iterations on the full local dataset has the advantage that the whole dataset is taken into account in the training, especially in the initial phases where it is particularly important have a good initial estimate of the model parameters. Having a good initial estimate may reduce the number of iterations needed later and may thus be more efficient even though the initial iterations may cost more resources. Also, since the initial model is not expected to be very accurate, filtering 260 may be expected to filter out only few inputs in the first iterations, making the performance penalty of using the full dataset relatively small. In some embodiments this can outweigh the additional costs of model application 250 and/or filtering 260. Also, a good initial estimate of the model parameters may be more likely to result in an accurate model, e.g., may decrease the chances of getting stuck in a local optimum.

However, there are also situations where performing initial iterations on the full dataset is not needed. For example, the training of the federated model may be an updating (sometimes called fine-tuning) of a previously trained model, e.g., trained by the federated learning system or elsewhere. In such cases, the model performance of the federated model at the start of the training may already be good enough, and/or the local training dataset may have already been taken into account during an earlier training, such that filtering 260 can already be performed during the first training iteration.

Given filtering 241-242, training 270 of the current federated model 290 may be performed. Interestingly, the current federated model 290 may be trained only on the subset of filtered training inputs. Since training scales in the number of items being trained on, efficiency is improved. Still, because the inputs are selected based on their relevance for the training (e.g., based on their contribution to the loss function optimized during training), the training is still effective in improving the federated model.

Training 270 may be implemented using training techniques that are known per se. For example, gradient descent may be used, e.g., stochastic gradient descent. For example, the Adam optimizer may be used as disclosed in Kingma and Ba, "Adam: A Method for Stochastic Optimization" (available at https://arxiv.org/abs/1412.6980 and incorporated herein by reference). As is known, such optimization methods may be heuristic and/or arrive at a local optimum. A training iteration may comprise multiple epochs, wherein an epoch passes over the data to be trained on once. Within an epoch, training may be performed on an instance-by-instance basis or in batches, e.g., of at most or at least 64 or at most or at least 256 instances.

Training 270 may comprise applying multiple training epochs to the subset of filtered training inputs. That is, a subset may be determined by filtering 260 and this filtering may be used in multiple training epochs. This has the advantage of being more efficient, because the filtering does not need to be repeated per epoch, while also improving training stability. For example, the number of epochs may be at most or at least 50, or at most or at least 100. Typically, the number of epochs is predefined and kept constant over iterations, although it is also possible to decide on a number of epochs based on amount of available time and/or resources, e.g., in combination with the number of filtered inputs. Filtering is then performed at most once per iteration, although performing filtering and training multiple times on a current federated model prior to sending the model update is also possible.

In various embodiments, training 270 may comprise a forward pass, in which the current federated model is applied to training inputs to determine model outputs; and a backward pass, in which the model update is determined based on the determined model outputs. This is the case for gradient descent and its variants, for example. In such cases, the forward pass of the training 270 and the model application 250 may be combined. For example, model application 250 may comprise performing the forward pass of the training, including storing intermediate values for later use in the backward pass. Filtering 260 may be performed based on the results of the forward pass, and the backward pass of training 270 may then be performed just on those inputs selected in filtering 260. This way, a performance improvement is obtained since the model does not need to be applied in the forward direction twice, while the backward direction is made faster due to the filtering.

As a result of training 270, a model update for the current federated model 290 may be obtained. The model update can take on various forms as is known per se for federated learning. For example, the model update may comprise an updated set of parameters for the current federated model, or a gradient for updating the current federated model.

The determined model update may then be sent to one or more other devices of the federated learning system, e.g., an aggregation device in the case of a centralized federated learning system, or one or more edge devices in the case of a decentralized federated learning system. In some embodiments, the edge device may be configured to not send the model update directly but to wait for an amount of time, e.g., until a given amount of time since receiving the current federated model has passed, or for a random amount of time. This way, leakage about the number of items that have been filtered out, and thus e.g. about the performance of the current federated model on the local dataset of the edge device, may be reduced.

In some embodiments, edge device 201 may be configured to determine an initial federated model by training on the local training dataset 211-212. This way, an initial model for use in the federated learning system may be obtained. Here, typically, no filtering takes place. Edge device 201 may send the initial federated model to one or more other devices of the federated learning system.

In the various embodiments of the described devices, e.g., devices 101, 109, 101', and 201, the communication interfaces may be selected from various alternatives. For example, the interface may be a network interface to a local or wide area network, e.g., the Internet, a storage interface to an internal or external data storage, a keyboard, an application interface (API), etc.

The devices 101, 101', 109, 201 may have a user interface, which may include well-known elements such as one or more buttons, a keyboard, display, touch screen, etc. The user interface may be arranged for accommodating user interaction for configuring the systems, training the federated model, or applying the resulting federated model to a new model input, etc.

Storage may be implemented as an electronic memory, say a flash memory, or magnetic memory, say hard disk or the like. Storage may comprise multiple discrete memories together making up memory 141, 141', 149 or the storage accessed by storage interface 121. Storage may comprise a temporary memory, say a RAM. The storage may be cloud storage.

Typically, the devices 101, 101', 109, 201 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the training of a federated model.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

FIG. 3 schematically illustrates an example of an embodiment of a computer-implemented edge method 300 of participating in a federated learning system for training a federated model. The federated learning system may comprise multiple edge devices. As part of the method, the federated model may be trained on respective local training datasets of the respective multiple edge devices. The method may be performed by an edge device, e.g., by edge device 101, 101', or 201 as described herein. The federated learning system can for example be a centralized federated learning system, e.g., as described with respect to FIG. 1*a*, or a decentralized federated learning system, e.g., as described with respect to FIG. 1*b*.

The method may comprise accessing 310 a local training dataset of an edge device. The local training dataset may comprise multiple training inputs and corresponding training outputs.

The method may comprise iteratively training 320 the federated model. An iteration of the iterative training may comprise obtaining 321 a current federated model. The iteration may further comprise determining 322 a model update for the current federated model based on the local training dataset. The iteration may further comprise sending 326 the model update to one or more other devices of the federated learning system The determining 322 of the model update in the iteration may comprise applying 323 the current federated model to a training input to obtain at least a model output for the training input. The determining 322 may further comprise, if the model output does not match a training output corresponding to the training input, including 324 the training input in a subset of filtered training inputs to be used in the iteration. The determining may further comprise determining 325 the model update by training the current federated model on only the subset of filtered training inputs.

FIG. 4 schematically illustrates an example of an embodiment of a computer-implemented federated learning method 400 of training a federated model by a federated learning system. The federated learning system may comprise multiple edge devices. As part of the method, the federated model may be trained on respective local training datasets of the respective multiple edge devices. The method 400 may comprise iteratively training the federated model. The federated learning system can for example be a centralized federated learning system, e.g., as described with respect to FIG. 1*a*, or a decentralized federated learning system, e.g., as described with respect to FIG. 1*b*.

To iteratively train the federated model, the method 400 may comprise, at an edge device of the federated learning system, obtaining 421 a current federated model; determining 422 a model update for the current federated model based on the local training dataset; and sending 426 the model update to one or more other devices of the federated learning system.

The determining 422 of the model update in the iteration may comprise applying 423 the current federated model to a training input to obtain at least a model output for the training input. The determining 422 may further comprise, if the model output does not match a training output corresponding to the training input, including 424 the training input in a subset of filtered training inputs to be used in the iteration. The method may further comprise determining 425 the model update by training the current federated model on only the subset of filtered training inputs.

The method 400 may further comprise, at one or more devices of the federated learning system, receiving 430 one or more model updates from edge devices of the federated learning system, and updating 440 the current federated model by aggregating said model updates. For example, in a centralized federated learning system, the receiving 430 and the updating 440 may be performed by an aggregation device, whereas in a decentralized federated learning system, the receiving 430 and the updating 440 may be performed by one or more of the edge devices.

Another envisaged method is a computer-implemented method of operating an aggregation device of a federated learning system as described herein. This method may comprise the iteratively training the federated model by, in an iteration: sending a current federated model to one or more edge devices; receiving model updates from the one or more edge devices; and updating the current federated model by aggregating said model updates.

The described methods may be computer implemented. For example, sending and receiving a current federated model, sending and receiving model updates, and/or accessing a local training dataset may be done using a communication interface, e.g., an electronic interface, a network interface, a memory interface, etc. For example, iteratively training the federated model and/or aggregating model updates may be done using an electronic computing device, e.g., a computer.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 300 and/or 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

FIG. 5 shows a computer readable medium 1000 having a writable part 1010 The writeable part 101 may comprise a computer program 1020, the computer program 1020 comprising instructions for causing a processor system to perform an edge method, a federated learning method, or a method of operating an aggregation device, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method. Instead of or in addition to comprising the computer program 1020, the writable part 1010 may comprise model data representing a federated model trained according to a method described herein. For example, the model data may comprise learnable parameters trained as described herein, e.g., neural network weights and the like.

FIG. 6 shows in a schematic representation of a processor system 1140 according to an embodiment of an edge device or an aggregation device. The processor system comprises one or more integrated circuits 1110. The architecture of the one or more integrated circuits 1110 is schematically shown in FIG. 6*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the edge device or aggregation device, may comprise a processor circuit and a memory circuit, the processor being arranged to execute software stored in the memory circuit.

For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It will be apparent that various information described as stored in a storage may be stored in the memory. In this respect, the memory may also be considered to constitute a "storage device" and the storage may be considered a "memory." Various other arrangements will be apparent. Further, the memory and storage may both be considered to be "non-transitory machine-readable media." As used herein, the term "non-transitory" will be understood to exclude transitory signals but to include all forms of storage, including both volatile and non-volatile memories.

While the device is shown as including one of each described component, the various components may be duplicated in various embodiments. For example, the processor may include multiple microprocessors that are configured to independently execute the methods described herein or are configured to perform steps or subroutines of the methods described herein such that the multiple processors cooperate to achieve the functionality described herein. Further, where the device is implemented in a cloud computing system, the various hardware components may belong to separate physical systems. For example, the processor may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In a device claim enumerating parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An edge device for use in a federated learning system for training a federated model, the edge device being comprised in a set of multiple edge devices, wherein the federated model is trained on respective local training datasets of the multiple edge devices, the edge device comprising:

a storage interface for accessing the local training dataset of the edge device, the local training dataset comprising multiple training inputs and corresponding training outputs; and a processor system configured to iteratively train the federated model by, in an iteration: obtaining a current federated model, determining a model update for the current federated model based on the local training dataset, and sending the model update to one or more other devices of the federated learning system, wherein determining the model update in the iteration comprises:

applying the current federated model to a training input to obtain at least a model output for the training input;

when the model output does not match a training output corresponding to the training input, include the training input in a subset of filtered training inputs to be used in the iteration; and determining the model update by training the current federated model on only the subset of filtered training inputs, wherein the subset of filtered training inputs to be used in the iteration is smaller than a subset of filtered training inputs to be used in a previous iteration.

2. The edge device of claim 1, wherein the processor system is configured to perform one or more iterations in which a model update is determined by training on the local training dataset in full, followed by one or more iterations in which a model update is determined by training on only the subset of filtered training inputs.

3. The edge device of claim 1, wherein the edge device is an IoT device.

4. The edge device of claim 1, wherein the processor system is configured to train the current federated model by applying multiple training epochs to the subset of filtered training inputs.

5. The edge device of claim 1, wherein the processor system is further configured to determine a confidence score of the current federated model for the training input; and, when the confidence score does not exceed a threshold, include the training input in the subset of filtered training inputs.

6. The edge device of claim 1, wherein the processor system is configured to train the current federated model in a forward pass in which the current federated model is applied to training inputs to determine model outputs, and a backward pass in which the model update is determined based on the determined model outputs; and wherein the processor system is configured to determine the subset of filtered training inputs to be used in the iteration based on the model outputs determined in the forward pass.

7. The edge device of claim 1, wherein the processor system is configured to include a training input in the subset of filtered training inputs that was not included in a subset of filtered training inputs of a previous iteration.

8. The edge device of claim 1, wherein the processor system is configured to receive the current federated model from an aggregation device of the federated learning system and to send the model update to the aggregation device.

9. The edge device of claim 1, wherein the processor system is configured to determine an initial federated model by training on the local training dataset, and to send the initial federated model to one or more other devices of the federated learning system.

10. The edge device of claim 1, wherein the model update comprises an updated set of parameters for the current federated model or a gradient for updating the current federated model.

11. A federated learning system for training a federated model, the federated learning system comprising multiple edge devices and an aggregation device, wherein the federated model is trained on respective local training datasets of the multiple edge devices, wherein an edge device of the multiple edge devices is configured to iteratively train the federated model by, in an iteration: receiving a current federated model from the aggregation device, determining a model update for the current federated model based on the local training dataset, and sending the model update to the aggregation device, wherein determining the model update in the iteration comprises:

applying the current federated model to a training input to obtain at least a model output for the training input;

when the model output does not match a training output corresponding to the training input, include the training input in a subset of filtered training inputs to be used in the iteration; and determining the model update by training the current federated model on only the subset of filtered training inputs, wherein the subset of filtered training inputs to be used in the iteration is smaller than a subset of filtered training inputs to be used in a previous iteration; and wherein the aggregation device is configured to iteratively train the federated model by, in an iteration: sending a current federated model to one or more edge devices; receiving model updates from the one or more edge devices, and updating the current federated model by aggregating the model updates.

12. A computer-implemented edge method of participating in a federated learning system for training a federated model, the federated learning system comprising multiple edge devices, wherein the federated model is trained on respective local training datasets of the multiple edge devices, the method comprising:

accessing a local training dataset of an edge device of the multiple edge devices, the local training dataset comprising multiple training inputs and corresponding training outputs;

iteratively training the federated model by, in an iteration: obtaining a current federated model, determining a model update for the current federated model based on the local training dataset, and sending the model update to one or more other devices of the federated learning system, wherein determining the model update in the iteration comprises:

applying the current federated model to a training input to obtain at least a model output for the training input;

when the model output does not match a training output corresponding to the training input, including the training input in a subset of filtered training inputs to be used in the iteration; and determining the model update by training the current federated model on only the subset of filtered training inputs, wherein the subset of filtered training inputs to be used in the iteration is smaller than a subset of filtered training inputs to be used in a previous iteration.

13. A computer-implemented federated learning method of training a federated model by a federated learning system, the federated learning system comprising multiple edge devices, wherein the federated model is trained on respective local training datasets of the respective-multiple edge devices, the method comprising iteratively training the federated model by:

at each edge device: obtaining a current federated model, determining a model update for the current federated model based on the local training dataset in an iteration, and sending the model update to one or more other devices of the federated learning system, wherein determining the model update in the iteration comprises:

applying the current federated model to a training input to obtain at least a model output for the training input;

when the model output does not match a training output corresponding to the training input, including the training input in a subset of filtered training inputs to be used in the iteration; and determining the model update by training the current federated model on only the subset of filtered training inputs, wherein the subset of filtered training inputs to be used in the iteration is smaller than a subset of filtered training inputs to be used in a previous iteration;

at one or more devices of the federated learning system, receiving one or more model updates from the multiple edge devices of the federated learning system and updating the current federated model by aggregating said model updates.

14. A non-transitory computer-readable medium storing—instructions which, when executed by a processor system, cause the processor system to perform the method according to claim 12.

15. The method of claim 13, further comprising:

performing at least one iteration in which a model update is determined by training on the local training dataset in full.

16. The method of claim 13, wherein training the current federated model comprises applying multiple training epochs to the subset of filtered training inputs.

17. The method of claim 13, further comprising:

determining a confidence score of the current federated model for the training input; and when the confidence score does not exceed a threshold, including the training input in the subset of filtered training inputs.

18. The method of claim 13, further comprising:

receiving the current federated model from an aggregation device; and sending the model update to the aggregation device.

19. The method of claim 13, further comprising:

determining an initial federated model by training on the local training dataset; and sending the initial federated model to at least one other edge device of the federated learning system.

20. The method of claim 13, wherein the model update comprises an updated set of parameters for the current federated model or a gradient for updating the current federated model.

* * * * *